United States Patent [19]

Nishio et al.

[11] Patent Number: 4,911,542
[45] Date of Patent: Mar. 27, 1990

[54] APPARATUS FOR PREVENTING INTERNAL REFLECTION IN ZOOM LENS

[75] Inventors: Etsuro Nishio; Shinsuke Kohmoto, both of Tokyo, Japan

[73] Assignee: Asahi Kogaku Kogyo K.K., Tokyo, Japan

[21] Appl. No.: 174,880

[22] Filed: Mar. 29, 1988

[30] Foreign Application Priority Data

Apr. 6, 1987 [JP] Japan .............................. 62-51929[U]

[51] Int. Cl.$^4$ ............................................. G02B 15/00
[52] U.S. Cl. ..................................... 350/429; 350/255
[58] Field of Search ...................... 350/429, 430, 255; 354/195.12, 400

[56] References Cited

U.S. PATENT DOCUMENTS

3,658,411  4/1972  Price ..................................... 350/429
4,576,446  3/1986  Kamata ............................... 350/429

Primary Examiner—Bruce Y. Arnold
Assistant Examiner—Loha Ben
Attorney, Agent, or Firm—Sandler & Greenblum

[57] ABSTRACT

In a zoom lens system having front and rear groups of lenses movable in an optical axis direction, an apparatus is provided for preventing internal reflection. The apparatus comprises a movable antireflection member which is located at the rear of the rear group of lenses to intercept harmfull light which would otherwise be incident upon a film plane. The antireflection member movable along the optical axis direction of the lens system, in association with the movement of the rear group of lens.

6 Claims, 11 Drawing Sheets

APPARATUS FOR PREVENTING INTERNAL REFLECTION IN ZOOM LENS

BACKGROUND OF THE INVENTION

1. Field of the Invention

The present invention relates to an apparatus for preventing light from being reflected from an internal surface of a zoom lens system.

2. Description of Related Art

Usually, a zoom lens system has at least front and rear groups of lenses which can be independently moved along the optical axis direction of the system to effect zooming operation. For instance, the assignee of the present application has proposed a lens shutter type of camera having a zoom lens, in PCT/JP No. 87/00293, in which front and rear groups of lenses can be independently moved in the optical axis direction of the zoom lens.

In a known zoom lens system, as mentioned above, the distance (separation) of the outermost effective light which is transmitted through the lenses, from the optical axis, varies in accordance with the zooming operation. The distance is large, especially on the outgoing side of light from the rearmost lens. This will be explained below with reference to FIGS. 18 to 20.

Figure 18:
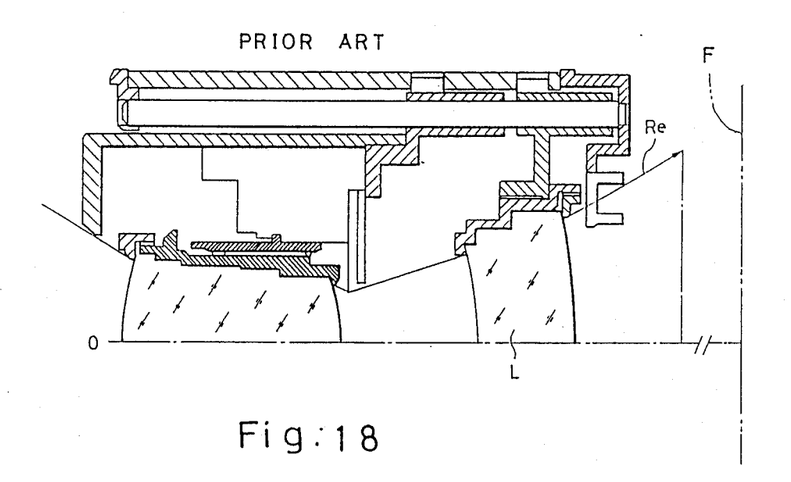
FIG. 18 is a sectional view of a known lens barrel block showing effective light at the shortest focal length.
Figure 19:
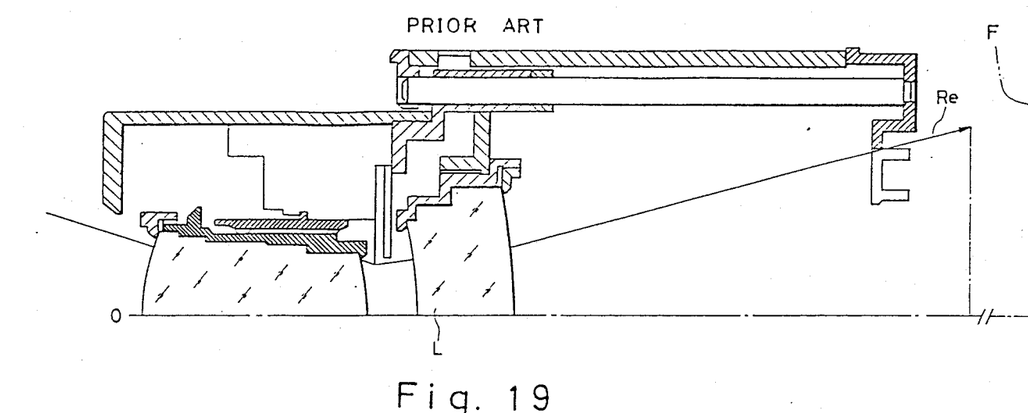
FIG. 19 is a view similar to FIG. 18, but showing effective light at the longest focal length; and, FIG. 20 is a view similar to FIG. 18, showing both effective light and harmful light at the longest focal length.
Figure 20:
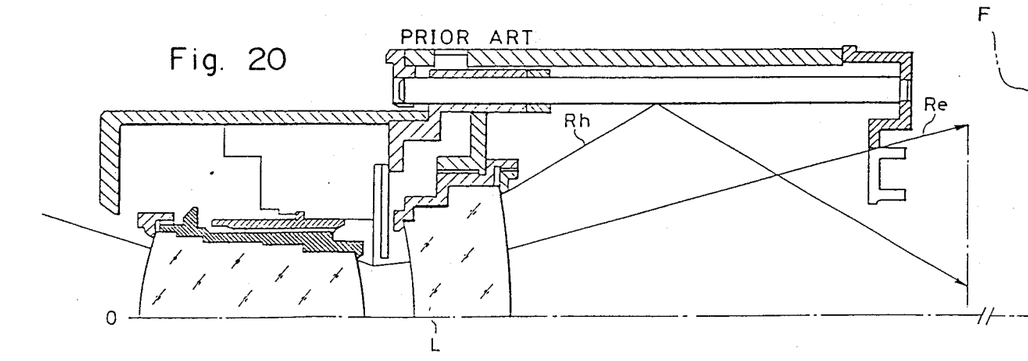

As can be seen in FIG. 18, the effective light Re which is transmitted through a rear group of lens L (which will be referred to as a rear lens group hereinafter) is emitted from the portion of the lens far from the optical axis O, at the shortest focal length. To the contrary, at the longest focal length, the effective light Re transmitted through the rear lens group L is emitted from a portion of the lens closer to the optical axis O, as shown in FIG. 19.

The sizes of the rearmost lens and a lens frame thereof are such that these elements do not intercept the effective light Re at any focal length. Namely, the sizes of the rearmost lens and the lens frame are determined in view of the outermost effective light Re which is transmitted through the rearmost lens at the portion thereof farthest from the optical axis O in a predetermined zooming range. Accordingly, at the longest focal length, there exist harmful light Rh which does not contribute to the formation of an image, as shown in the FIG. 20. The harmful light Rh is reflected in lens barrel block of the camera and reaches a film plane, resulting in an adverse influence on the quality of an image.

The primary object of the present invention is, therefore, to eliminate the above-mentioned drawback by providing a simple apparatus for preventing such harmful light, which would be otherwise incident upon the film plane, from being reflected in the lens barrel block of a zoom lens system.

SUMMARY OF THE INVENTION

To achieve the aforementioned object, according to the present invention, an apparatus is provided for preventing internal reflection in a zoom lens system having at least front and rear groups of lenses which can be moved in an optical axis direction, wherein said apparatus comprises a movable antireflection member which is located at the rear of the rear lens group to intercept harmful light which would otherwise be incident upon a film plane, said antireflection member being movable in the optical axis direction, in association with the movement of the rear lens group.

With this arrangement, all of the effective light can effectively pass through the antireflection wall, which is moved in the optical axis in accordance with the zooming operation, and the harmful light can be substantially intercepted by the antireflection member. No substantial internal reflection of harmful light will then take place in the zoom lens system.

The harmful light referred to herein is defined by the light which is reflected by the internal surface of the lens barrel after it emerges from the final lens of the zoom lens system, and then reaches the film plane. The harmful light results in a decreased image contrast, and in decreased quality of color film.

The effective light referred to herein is defined as a sufficient amount of light which is directly focused on the film plane to form a desired image thereon.

BRIEF DESCRIPTION OF DRAWINGS

The invention will be described below in detail with reference to the accompanying drawings, in which.

DETAILED DESCRIPTION OF EMBODIMENTS

Figure 4:
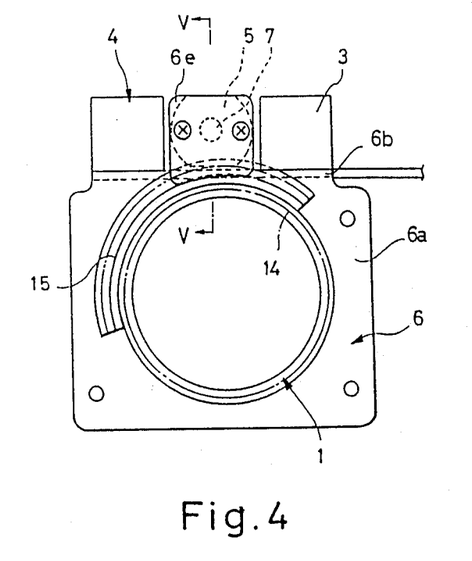
FIG. 4 is a front elevational view of a base plate which is secured to a camera body.
Figure 5:
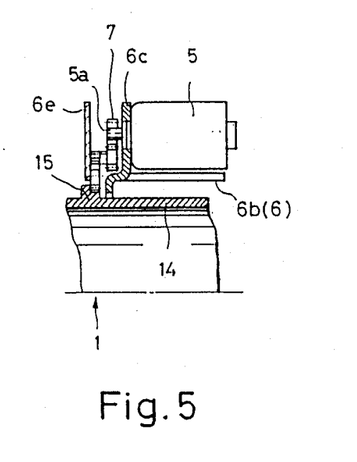
FIG. 5 is a sectional view taken along line V—V in FIG. 4.

In FIGS. 1 to 17, which show one embodiment of the invention, the reflection preventing apparatus of the invention is incorporated in a lens shutter type of zoom lens camera, as disclosed in the above-mentioned PCT/JP No. 87/00293. A zooming optical system of the lens shutter type of zoom lens camera includes a lens barrel block 1 of a zoom lens, a finder strobe block 2, light emitter 3 and light receiver 4 of an object distance measuring device (AF device), and a zoom motor 5 for the zooming operation, as generally shown in FIG. 3. These elements are secured to a base plate 6 (FIGS. 4 to 6) which constitutes a stationary portion of a camera body.

The base plate 6 has a lens barrel supporting plate portion 6a perpendicular to the optical axis, a horizontal supporting plate portion 6b which is formed by bending the upper end of the lens barrel supporting plate portion 6a at a right angle, and a motor supporting plate portion 6c which extends perpendicularly to the horizontal supporting plate portion 6b. The lens barrel block 1 is supported by the lens barrel supporting plate portion 6a.

Figure 6:
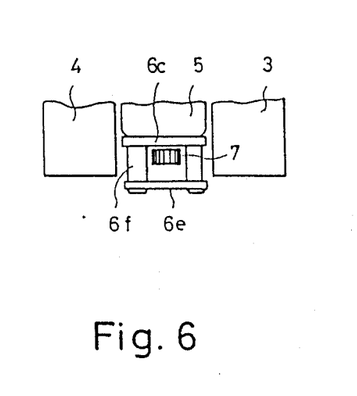
FIG. 6 is a plan view of FIG. 4.

The zoom motor 5 is secured to the motor supporting plate portion 6c, above the upper center portion of the lens barrel block 1. The light emitter 3 and the light receiver 4, secured to the horizontal supporting plate portion 6b, are located on opposite sides of the zoom motor 5. The finder strobe block 2 is secured to the right portion of the horizontal supporting plate portion 6b, when viewed from the front of the camera. A gear train supporting plate 6e is secured to the motor supporting plate portion 6c through spacers 6f (FIG. 6).

Figure 1:
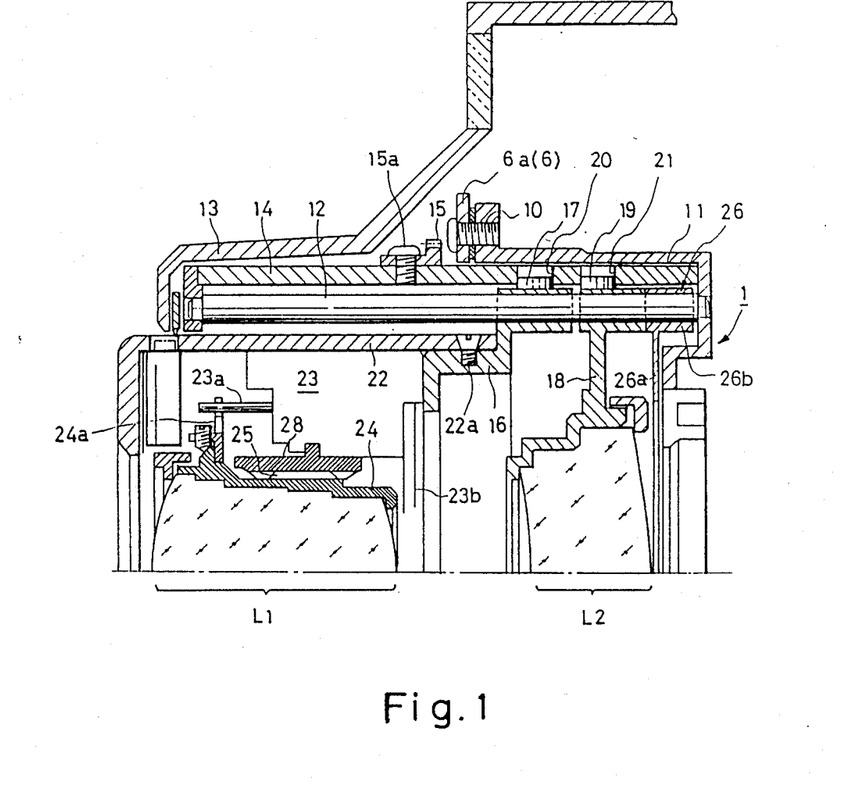
FIG. 1 is a sectional view of an upper half of a lens barrel block of a lens shutter type of zoom lens camera having a reflection preventing apparatus in accordance with the present invention, the view being taken along the optical axis.
Figure 2:
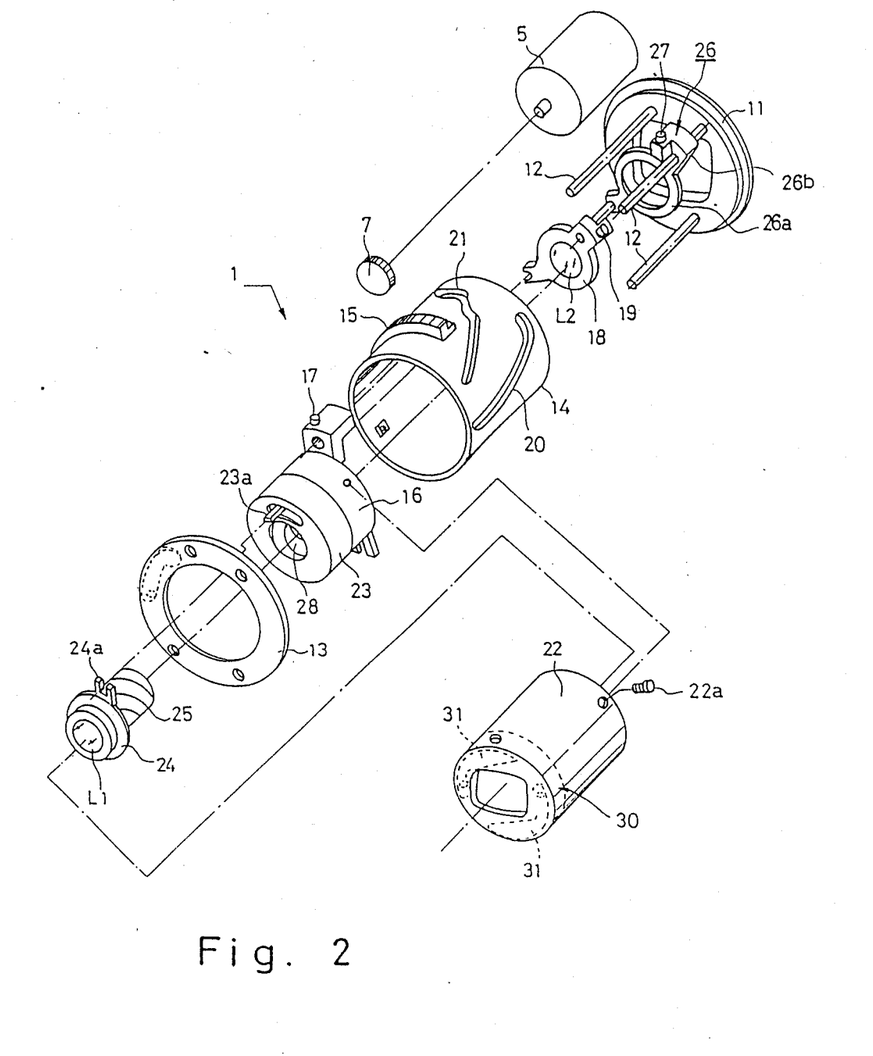
FIG. 2 is an exploded perspective view of the lens barrel block shown in FIG. 1.
Figure 3:
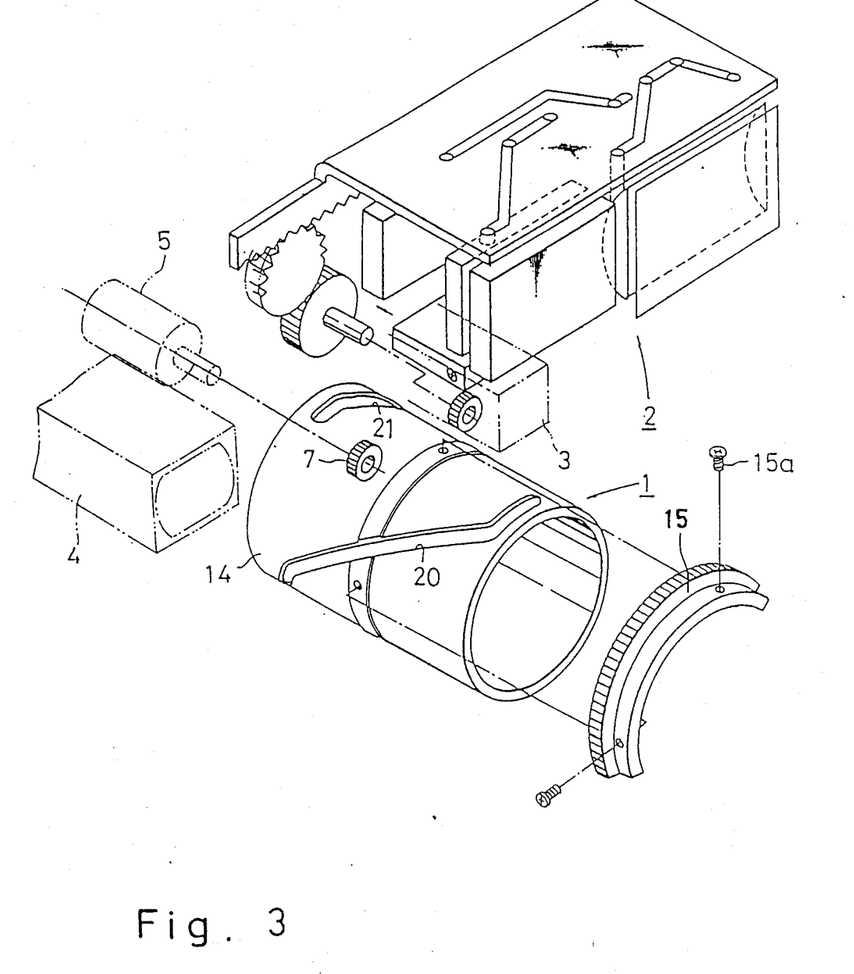
FIG. 3 is a schematic perspective view of the lens barrel block shown in FIG. 1.

The lens barrel block 1 is driven by the zoom motor 5 and is constructed as shown in FIGS. 1 to 3. In the illustrated embodiment, the lens barrel block 1 is capable of zooming and macro-photographing. To the lens barrel supporting plate portion 6a of the base plate 6, a rear securing plate 11 is secured by means of set screws 10. The rear securing plate 11 has four guide rods 12 secured thereto which are concentrically located with respect to the optical axis and which extend parallel to the optical axis. The guide rods 12 are provided, on their front ends, with a front securing plate 13 secured thereto. The aforementioned elements are main elements of the lens barrel block 1.

Between the front and rear securing plates 13 and 11 a cam ring 14 is provided which is rotatably supported therebetween and which is provided, along its outer periphery, with a sector gear 15 integrally connected by means of set screws 15a. The sector gear 15 is in mesh, directly or through a gear train (not shown), with a pinion 7 of zoom motor 5.

Figure 7:
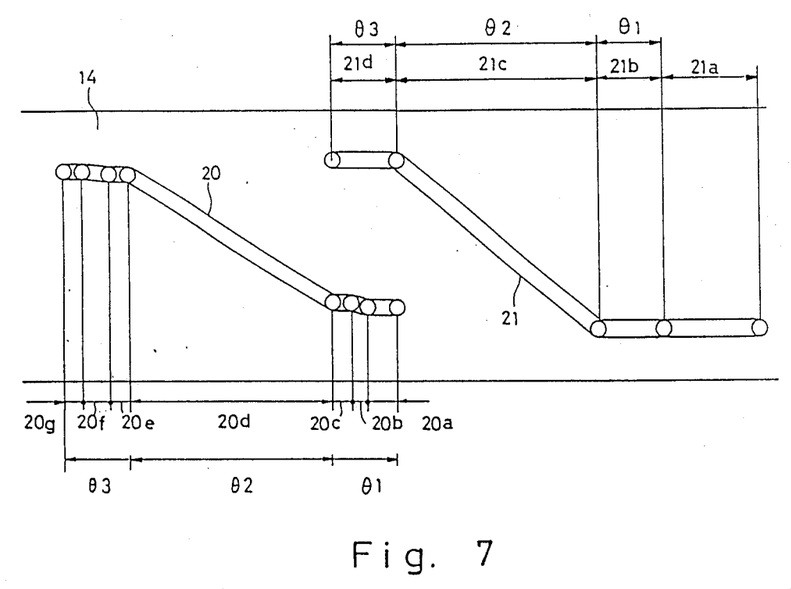
FIG. 7 is a developed view of a cam ring.

The cam ring 14 has zooming cam grooves (through openings) 20 and 21 for the front lens group and the rear lengs group, on periphery of the cam ring 14. FIG. 7 shows a developed view of the zooming cam grooves 20 and 21. In FIG. 7, the zooming cam groove 20 has an opening and closing section 20a of the barrier block 30 (FIG. 2), a lens accommodating section 20b, a wide angle extremity fixing section 20c, a variable power section 20d, a telephoto extremity fixing section 20e, a macro feeding section 20f, and a macro extremity fixing section 20g. The zooming cam groove 21 for the rear lens group has an extension section 21a for an antireflection wall, a wide angle extremity fixing section 21b, a variable power section 21c, and a telephoto extremity fixing section 21d.

The rotational angles of the above-mentioned cam groove sections are such that the total angle 1 of the barrier opening and closing section 20a, the lens accommodating section 20b, and the wide angle extremity fixing section 20c, all of the cam groove 20 for the front lens group, is identical to the angle 1 of the wide angle extremity fixing section 21b of the cam groove 21 for the rear lens group, that the angle 2 of the variable power section 20d is identical to the angle 2 of the variable power section 21c, and that the total angle 3 of the telephoto extremity fixing section 20e, the macro feeding section 20f and the macro extremity fixing section 20g, is identical to the angle 3 of the telephoto extremity fixing section 21d. The barrier block 30 opens and closes a pair of barriers 31, 31 which serve as lens caps, in accordance with the rotation of the cam ring 14 within the barrier opening and closing section 20a.

In the zooming cam grooves 20 and 21 are fitted a roller 17 of a front lens barrel 16 for moving the front lens group, a roller 19 of a rear lens barrel 18 for moving the rear lens group, and a roller 27 for an antireflection wall 26. The lens barrels 16 and 18, and the antireflection wall 26, are displaceably supported on and by the guide rods 12, as can be seen in FIGS. 1 and 2.

Two of the four guide rods 12 are slidably fitted on the front lens barrel 16. To the front end of the front lens barrel 16 is secured a shutter block 23 which has an annular helicoid 28 on the inner periphery thereof. The lens barrel 16 has a barrier block frame 22 which is fitted to the outer periphery of the lens barrel 16 by means of machine screws 22a, in order to form an integral part of the lens barrel 16. A lens frame 24 which supports the front lens group L1 has a helicoid 25 which comes into mesh with the helicoid 28 of the shutter block 23. The front lens frame 24 has an arm 24a in which a lens feeding lever 23a of the shutter block 23 is engaged, so that when the lens feeding lever 23a is rotated to rotate the front lens frame 24, the latter moves along the optical axis directions in accordance with the helicoid 25.

The operation of the shutter block 23 which is, per se well known, will be briefly discussed below.

The lens feeding lever 23a is rotated by an angle in accordance with the distance signal from the distance measuring device having the light emitter 3 and the light receiver 4, by means of a pulse motor (not shown) incorporated in the camera body, to complete the focusing operation. The shutter (sector) 23b which has been closed is opened for a predetermined time in accordance with the control signal of the exposure control device. The lens feeding lever 23a is returned to its initial position after the shutter 23b is closed again to effect exposure.

On the remaining two guide rods 12, on which the lens barrel 16 for moving the front lens group is not fitted, lens barrel 18, for moving the rear lens group, is slidably fitted adjacent to the front securing plate 13 and the antireflection wall 26 adjacent to the rear securing plate 11. The antireflection wall 26 has an annular portion 26a which has its center on the optical axis O and a boss portion 26b which is slidably supported on and by the associated guide rods 12. The inner diameter of the annular portion 26a, and the shape of the antireflection wall 26, can be determined in accordance with the characteristics of the zoom lens system. The antireflection wall 26 has a roller 27 which is fitted in the zooming cam groove 21 for the rear lens group. The rear lens group L2 is directly connected to the rear lens barrel 18.

The rear securing plate 11 and the antireflection wall 26 are entirely or partially (at least on their inner surfaces) subject to an antireflection treatment, such as a lusterless paint or a flocking.

Figure 8:
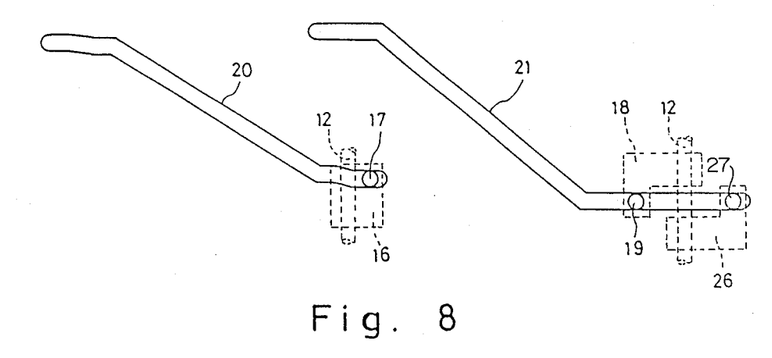
FIG. 8 is a developed view of a cam groove in relation to a lens barrel used for moving a front group of lenses (which will be referred to as a front lens group hereinafter), a lens barrel for moving the rear lens group, and an antireflection wall of the invention, in a position in which a barrier is closed.

The operational relationship between the zooming cam grooves 20, 21, the rear lens barrel 18, and the antireflection wall 26, is shown in FIG. 8. Namely, the zooming cam groove 20 for the front lens group moves only the lens barrel 16 for the front lens group through the roller 17, and the zooming cam grooves 21 for the rear lens group moves both the rear lens barrel 18 and the antireflection wall 26, which are slidably fitted on the same guide rods 12, through the respective rollers 19 and 27. Note that the roller 27 is fitted in the rear group zooming cam groove 21 closer to the extension section 21a (i.e., the wide angle side) than the roller 19.

The finder device and the strobe device which are incorporated in the finder strobe block 2 are not essential elements of the present invention, and, accordingly, no detailed explanation therefore is given.

Figure 9:
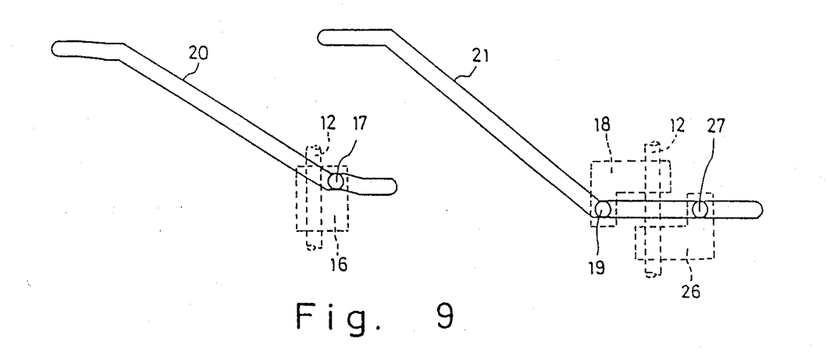
FIG. 9 is a view similar to FIG. 8, but shown at the shortest focal length.
Figure 10:
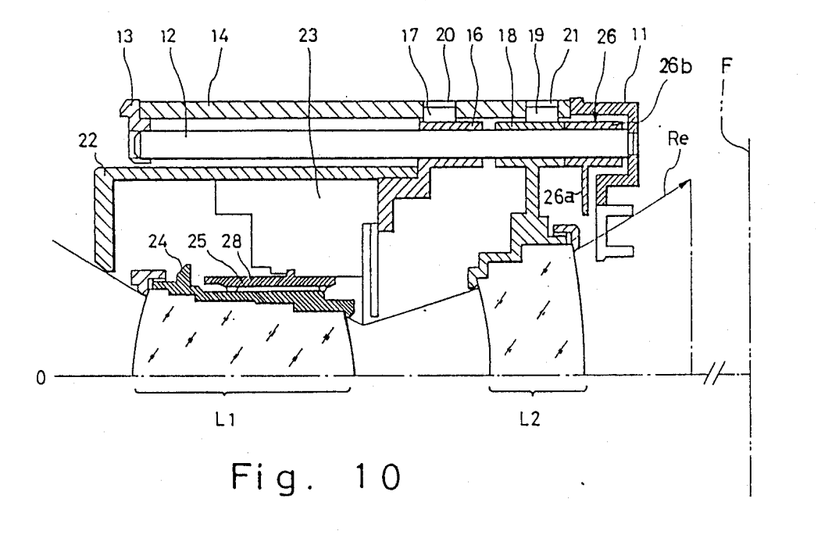
FIG. 10 is a sectional view of a lens barrel block showing the operation of an antireflection wall of the invention, at the shortest focal length.

At the shortest focal length shown in FIGS. 9 and 10, the lens barrel 18 for the rear lens group and the antireflection wall 26 are located closest to the film plane (lowermost in FIG. 9). In this position, almost all of the light beams which are transmitted through the rear lens group L2 are effective light beams.

Figure 11:
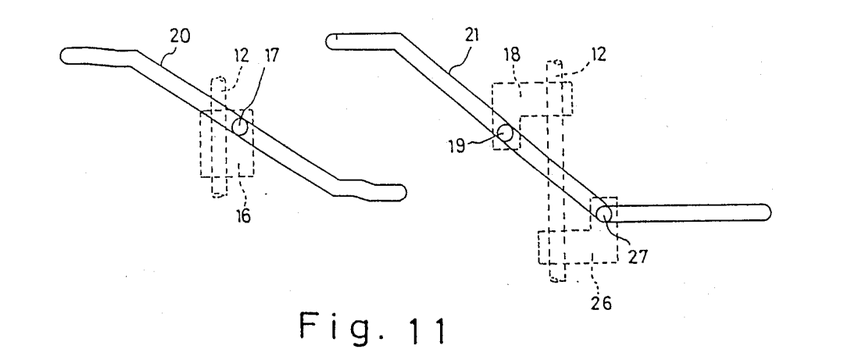
FIG. 11 is a view similar to FIG. 8, but shown in a position in which the antireflection wall begins to move.

When the cam ring 14 is rotated over the total angle of the extension section 21a for the antireflection wall and the wide angle extremity fixing section 21b of the zooming cam groove 21, in order for the rear lens group to effect zooming, as shown in FIG. 11, the antireflection wall 26 moves forwardly (upwardly in FIG. 11) in the optical axis direction, in accordance with the variable power section 21c of the rear zooming cam groove 21.

Figure 12:
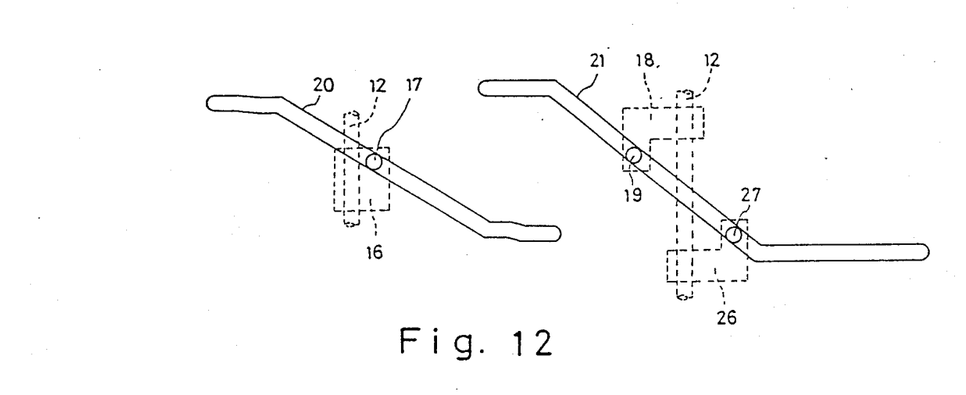
FIG. 12 is a view similar to FIG. 8, but shown at an intermediate focal length.
Figure 13:
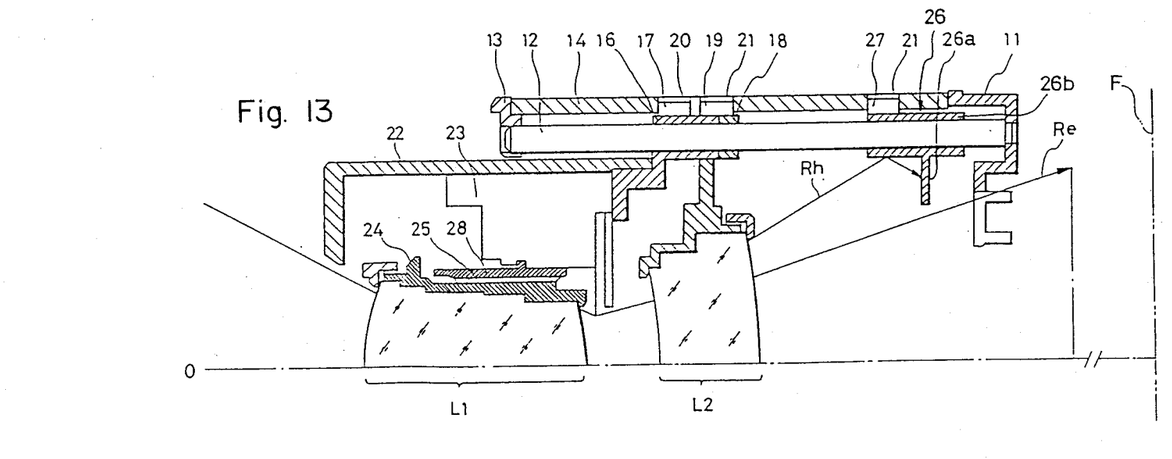
FIG. 13 is a view similar to FIG. 10, but shown at an intermediate focal length.

Further zooming causes the front lens group L1, the rear lens group L2, and the antireflection wall 26 to be fed forwardly, as shown in FIGS. 12 and 13. As a result, the harmful light beams Rh reach the antireflection wall 26. However, these harmful light beams Rh are mostly absorbed by the antireflection wall 26 which is subject to an antireflection treatment, as mentioned above, so that few harmful light beams are reflected toward the rear lens group L2. Accordingly, even if only a few light beams which cannot be absorbed by the antireflection wall are reflected again in the lens barrel block towards the film plane R (FIG. 13), the amount of beams incident upon the film plane is too small as to have an adverse influence on image formation.

Figure 14:
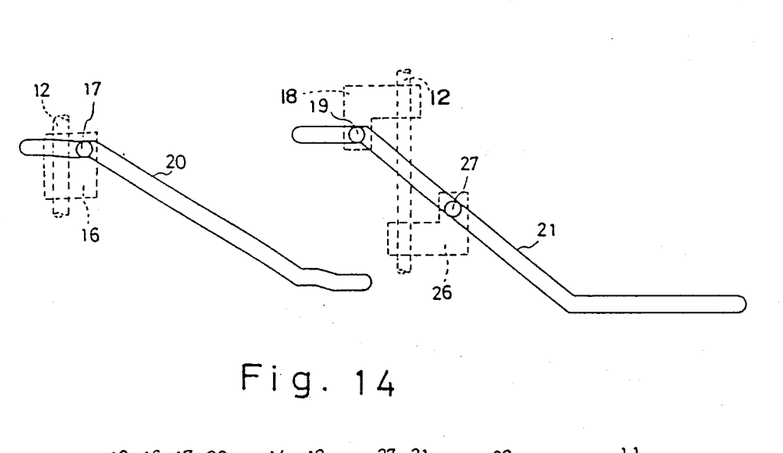
FIG. 14 is a view similar to FIG. 8, but shown at the longest focal length.
Figure 15:
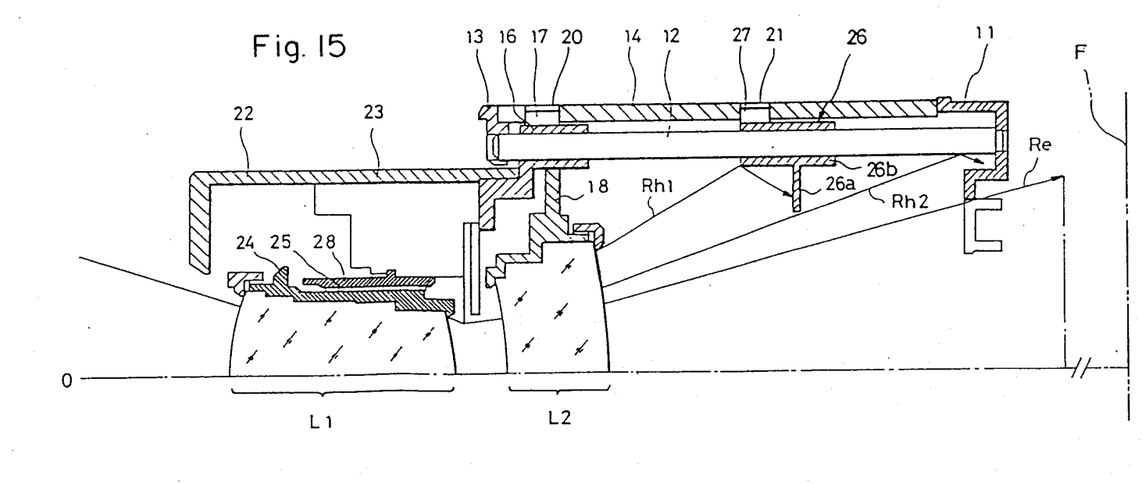
FIG. 15 is a view similar to FIG. 10, but shown at the longest focal length.

At the longest focal length shown in FIGS. 14 and 15, the harmful light Rh1 which emerges from the rear lens group L2, at the furthest portion from the optical axis O, is intercepted by the antireflection wall 26. On the other hand, although the harmful light Rh2 which passes inside the antireflection wall 26 is reflected within the lens barrel block, the light Rh2 is intercepted by the rear securing plate 11, so that it cannot reach the film plane.

Figure 16:
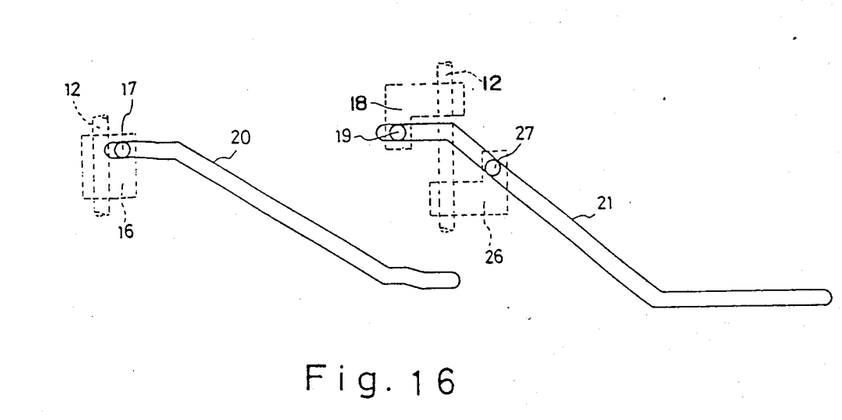
FIG. 16 is a view similar to FIG. 8, but shown in a macro-mode.
Figure 17:
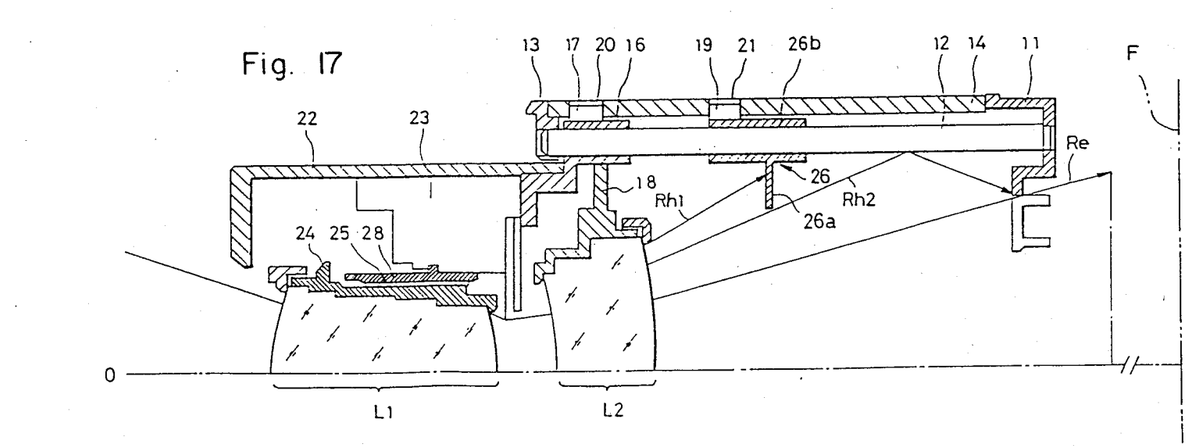
FIG. 17 is a view similar to FIG. 10, but shown in a macro-mode.

This is applicable to the macro-mode shown in FIGS. 16 and 17. Namely, at the macro-mode, the harmful light Rh1 and Rh2 is mostly absorbed and intercepted by the antireflection wall 26 and the rear securing plate 11, and accordingly, little or no harmful light reaches the film plane, similarly to FIGS. 14 and 15.

As can be understood from the above discussion, according to the present invention, while all of the effective light can effectively pass through the antireflection wall which is moved along the optical axis in accordance with the zooming operation, harmful light can be substantially intercepted by the antireflection wall (and the rear securing plate). No substantial reflection of harmful light will thus take place in the zoom lens system.

Furthermore, according to the present invention, since the guide rods 12 which slidably support the antireflection wall 26 and the zooming cam groove 21 for moving the antireflection wall 26 are common to those of the lens barrel 21 for moving the rear lens group, it is only necessary to extend the wide angle extremity fixing section 21b of the zooming cam groove 21 for the rear lens group in order to provide the extension section 21a on the cam ring 14. The common use of the guide rods and the zooming cam groove results in a decreased number of necessary elements in the apparatus of the invention.

It should be born in mind that the annular portion of the antireflection wall can be replaced with another shape of an antireflection member having, for example, a shape corresponding to the shape of the film plane, so as to intercept the harmful light which would otherwise reach the film plane.

It is possible to slidably fit the antireflection wall 26 onto the guide rods 12 for the lens barrel 16 for moving the front lens group, instead of on the guide rods for the lens barrel 18 for the rear lens group.

We claim:

1. A lens system having means for preventing undesired light beams from reaching a focal plane, said lens system comprising:

a rear securing plate;

a first and a second guide post perpendicularly secured to said rear securing plate;

an antireflection wall that is freely and slidably supported by said first guide post;

a first roller, said first roller being mounted on the circumference of said antireflection wall such that said first roller is substantially perpendicular to the optical axis of said lens system;

a rear lens, said rear lens being freely and slidably supported by said first guide post, said rear lens being located forward of said antireflection wall;

a second roller, said second roller being mounted on the circumference of said rear lens such that said second roller is substantially perpendicular to the optical axis of said lens system;

a lens barrel, said lens barrel being freely and slidably supported by said second guide post and having a third roller mounted thereon, said lens barrel being spaced forward of said rear lens a predetermined distance and having an aperture through its center substantially perpendicular to its circumference for accepting a front lens, said front lens being rotatable in said lens barrel;

a cam ring having a first and second cam groove, said cam ring being positioned around said first and second guide posts, said antireflection wall, said rear lens and said lens barrel such that one end of said cam ring is proximate said rear securing plate, said first and second rollers engaging said first cam groove in said cam ring and said third roller, engaging said second cam groove in said cam ring, said cam ring being rotatable about the optical axis of said lens system relative to said rear securing plate so as to cause a sliding of said lens barrel, said rear lens and said antireflection wall on said guide posts in response to each roller following a predetermined path determined by the shape of said cam grooves, the shape of said first cam groove being selected so as to position said antireflection wall at a point along the optical axis of said lens system to intercept said undesired light beams that exit from said rear lens;
a front securing plate, said front securing plate being positioned proximate the other end of said cam ring that is proximate said lens barrel, said guide posts being secured to said front securing plate; and
means for rotatably moving said front lens mounted in said lens barrel.

2. A lens system having means for preventing undesired light beams from reaching a focal plane, said lens system comprising:
a front lens mounted in a lens barrel, said front lens being rotatable in said lens barrel;
a rear lens;
an antireflection wall located rearward of said rear lens;
a cam ring, said cam ring having a first cam groove and a second cam groove; and
a securing plate, said securing plate being positioned proximate an end of said cam ring proximate said rear lens, said securing plate having a first guide post that is perpendicularly secured to said securing plate for slidably supporting said rear lens and said antireflection wall in a variably spaced relationship relative to the optical axis of said lens system, said antireflection wall having means for engaging said first cam groove in said cam ring, said rear lens having means for engaging said first cam groove in said cam ring, said securing plate having a second guide post that is perpendicularly secured to said securing plate for slidably supporting said lens barrel, said lens barrel having means for engaging said second cam groove in said cam ring, so that as said cam ring is rotated about the optical axis of said lens system relative to said securing plate so as to cause a sliding of said lens barrel, said rear lens and said antireflection wall follow a predetermined path as determined by the shape of said first cam groove, the shape of said first cam groove being selected so as to position said antireflection wall at a point along the optical axis of said lens system such that undesired light beams exiting from said rear lens are intercepted by said antireflection wall.

3. The device of claim 2, further comprising a motor for rotating said cam ring.

4. The device of claim 2, wherein said lens barrel is operable to move said front lens along the optical axis of said lens system, independent of any movement of said lens barrel.

5. The device of claim 2, further comprising a second securing plate that is located proximate another end of said cam ring proximate said front lens.

6. The device of claim 5, wherein said second guide post that supports said lens barrel is secured to said second securing plate.

* * * * *

UNITED STATES PATENT AND TRADEMARK OFFICE
CERTIFICATE OF CORRECTION

PATENT NO. : 4,911,542

DATED : March 29, 1990

INVENTOR(S) : E. Nishio et al

It is certified that error appears in the above-identified patent and that said Letters Patent is hereby corrected as shown below:

Col. 1, line 47, after "in" insert ---the---.

Col. 4, line 2, change "1" to ---θ1---.

Col. 4, line 6, change "1" to ---θ1---.

Col. 4, line 8, change "2" to ---θ2---.

Col. 4, line 9, change "2" to ---θ2---.

Col. 4, line 10, change "3" ---θ3---.

Col. 4, line 12, before "and" insert ---.---.

Col. 4, line 13, change "3" to ---θ3---.

Col. 5, line 10, change "grooves" to ---groove---.

Col. 5, line 47, change "R" to ---F---.

Col. 6, Claim 1, line 62, after "roller' delete ",".

Signed and Sealed this

Twenty-second Day of September, 1992

Attest:

DOUGLAS B. COMER

Attesting Officer

Acting Commissioner of Patents and Trademarks